US009977445B2

(12) United States Patent
Cui

(10) Patent No.: US 9,977,445 B2
(45) Date of Patent: May 22, 2018

(54) LOW POWER STANDBY MODE FOR BUCK REGULATOR

(71) Applicant: STMicroelectronics (Beijing) R&D Co. Ltd, Beijing (CN)

(72) Inventor: Zhenghao Cui, Beijing (CN)

(73) Assignee: STMicroelectronics (Beijing) R&D Co. Ltd, Beijing (CN)

( * ) Notice: Subject to any disclaimer, the term of this patent is extended or adjusted under 35 U.S.C. 154(b) by 0 days. days.

(21) Appl. No.: 15/051,406

(22) Filed: Feb. 23, 2016

(65) Prior Publication Data

US 2017/0235321 A1    Aug. 17, 2017

(30) Foreign Application Priority Data

Feb. 16, 2016 (CN) .......................... 2016 1 0088031

(51) Int. Cl.
G05F 1/565 (2006.01)
G05F 1/575 (2006.01)
H02M 1/00 (2006.01)

(52) U.S. Cl.
CPC ..... G05F 1/575 (2013.01); H02M 2001/0032 (2013.01); H02M 2001/0045 (2013.01)

(58) Field of Classification Search
CPC .............. H02M 2001/0045; H02M 2001/0032
See application file for complete search history.

(56) References Cited

U.S. PATENT DOCUMENTS

| 7,064,531 | B1 | 6/2006 | Zinn |
| 7,148,670 | B2 | 12/2006 | Inn et al. |
| 2003/0231012 | A1* | 12/2003 | Corva ................... H02M 3/156 323/285 |
| 2004/0239301 | A1* | 12/2004 | Kobayashi .......... H02M 3/1588 323/284 |
| 2005/0088856 | A1* | 4/2005 | Yamamoto .......... H02M 3/1588 363/19 |
| 2005/0189931 | A1* | 9/2005 | Ishino ................. H02M 3/1584 323/282 |
| 2006/0158165 | A1* | 7/2006 | Inn .......................... G05F 1/575 323/280 |
| 2009/0072626 | A1* | 3/2009 | Watanabe ........... H02M 3/1588 307/85 |
| 2010/0320983 | A1* | 12/2010 | Wu ..................... H02M 3/1584 323/283 |
| 2012/0286751 | A1* | 11/2012 | Sakaguchi ............. G05F 1/573 323/282 |
| 2013/0162233 | A1 | 6/2013 | Marty |
| 2014/0327419 | A1* | 11/2014 | Zeng ....................... G05F 1/573 323/277 |

* cited by examiner

Primary Examiner — Harry Behm
(74) Attorney, Agent, or Firm — Crowe & Dunleavy

(57) ABSTRACT

An electronic device disclosed herein includes a linear output stage configured to generate an output voltage to an output node as a function of an input voltage, and a buck output stage configured to generate the output voltage to the output node as a function of the input voltage. Control circuitry is configured to enable the linear output stage and disable the buck output stage if a current demanded by a load to maintain the output voltage at a desired level is less than a limit current, and enable the buck output stage and disable the linear output stage a delay period of time after enabling the buck output stage, if the current demanded by the load to maintain the output voltage at the desired level is greater than the limit current.

16 Claims, 2 Drawing Sheets

LOW POWER STANDBY MODE FOR BUCK REGULATOR

PRIORITY CLAIM

This application claims priority from Chinese Application for Patent No. 201610088031.6 filed Feb. 16, 2016, the disclosure of which is incorporated by reference.

TECHNICAL FIELD

This disclosure relates to the field of voltage regulators, and, more particularly, to a voltage regulator capable of operating in a low power consumption standby mode and a buck mode.

BACKGROUND

A buck regulator is a kind of switching voltage regulator which converts an unregulated input voltage into a lower regulated output voltage. The current consumed by the voltage regulator can be divided into two parts, namely the power provided to the load and the power provided to the buck regulator itself.

During normal operation, when the current demanded by the load is in a certain range, the regulator can maintain a high converting efficiency because the power provided to the load is much higher than the power provided to the buck regulator itself. When the current demanded by the load is low, or even zero, the converting efficiency is much lower because much of the power provided from the supply is provided to the buck regulator itself.

In the interest of increasing efficiency of buck regulators when the current demand by the load is low, further developments in the area of buck regulators are desired.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

An electronic device disclosed herein includes a linear output stage configured to generate an output voltage to an output node as a function of an input voltage, and a buck output stage configured to generate the output voltage to the output node as a function of the input voltage. Control circuitry is configured to enable the linear output stage and disable the buck output stage if a current demanded by a load to maintain the output voltage at a desired level is less than a limit current, and enable the buck output stage and disable the linear output stage a delay period of time after enabling the buck output stage, if the current demanded by the load to maintain the output voltage at the desired level is greater than the limit current.

Also disclosed herein is an electronic device that includes an error amplifier configured to generate an error voltage on an error node as a function of a reference voltage and a feedback voltage from a feedback node, and a linear output stage configured to generate an output voltage to an output node as a function of an input voltage from an input node in a manner such that an output current flowing through the output node is no more than a limit current. A buck output stage is configured to generate the output voltage to the output node as a function of the input voltage in a manner such that the output current flowing through the output node is greater than the limit current. A feedback loop couples the output node to the feedback node, and control circuitry is configured to selectively enable and disable the linear output stage and the buck output stage as a function of the error voltage, the selective enabling of the buck output stage occurring a delay period of time before the selective disabling of the linear output stage.

A method aspect is directed to a method including generating a limit current, and converting a higher input voltage to a lower output voltage using a linear output stage if a current demanded by a load to maintain the lower output voltage at a desired level is no more than a limit current. The method also includes converting the higher input voltage to the lower output voltage using a buck output stage and the linear output stage for a delay period of time, and after the delay period of time using the buck output stage, if the current demanded by the load to maintain the lower output voltage at the desired level of greater than the limit current.

DETAILED DESCRIPTION

In the following description, numerous details are set forth to provide an understanding of the present disclosure. It will be understood by those skilled in the art, however, that the embodiments of the present disclosure may be practiced without these details and that numerous variations or modifications from the described embodiments may be possible.

Generally speaking, disclosed herein is a voltage regulator capable of operating in a buck mode as well as a low power standby mode. To that end, a current limited linear output stage is added to a buck regulator to conduct power between an input and an output while in standby mode, when the load demand current is low. Meanwhile, the buck output stage, which is not useful in the standby mode, is disabled to save power. The error amplifier of the buck regulator itself controls the linear output stage during low power mode. Thus, the voltage regulator works as a linear regulator when in the low power mode and works as a buck regulator when in a normal operating mode. An offset voltage is added between an output of the error amplifier and input of the linear output stage to help switching between the linear mode and the buck mode. Control circuitry is used to determine which part of the voltage regular is to be enabled.

Figure 1:
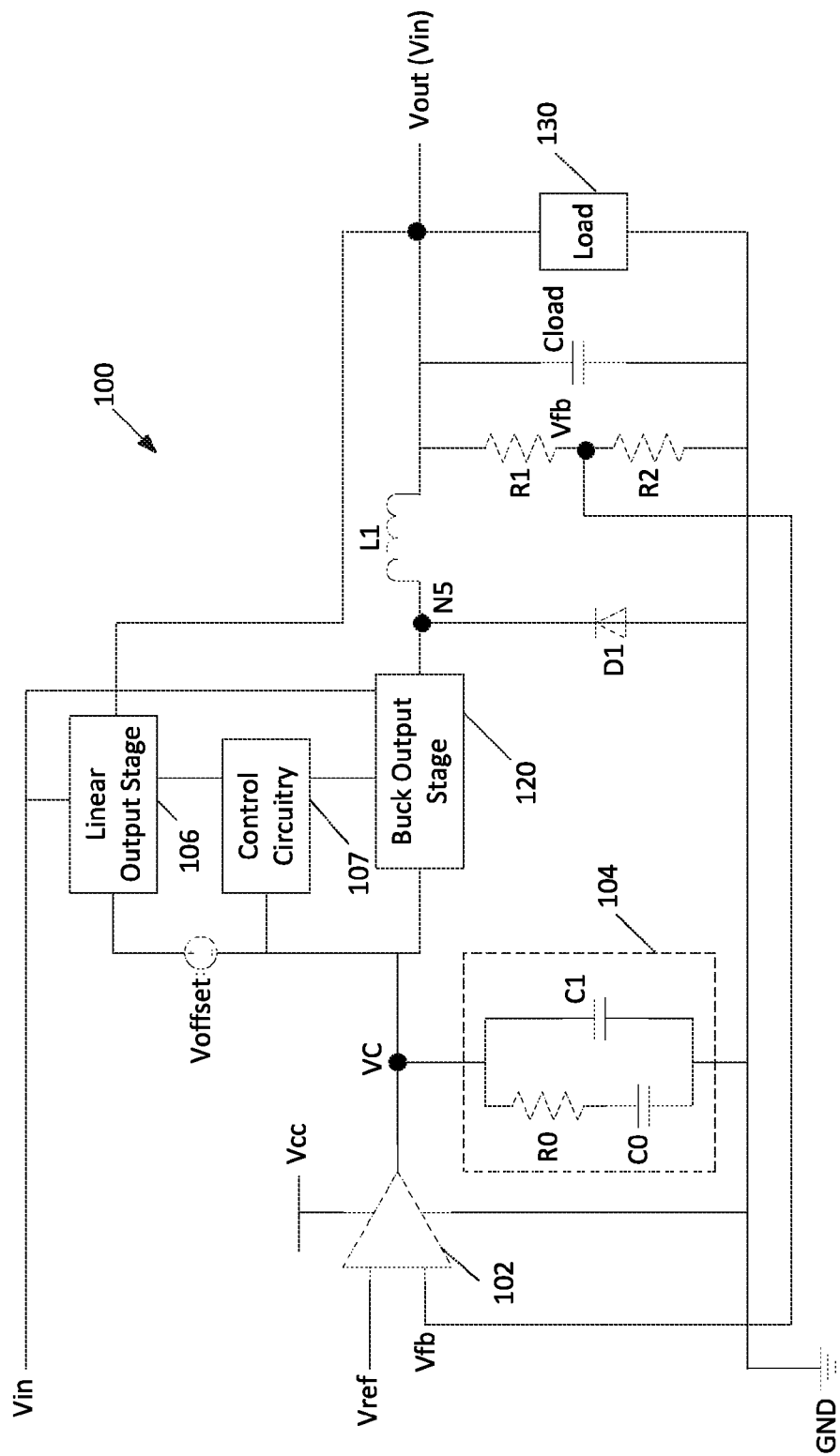
FIG. 1 is a schematic block diagram of a regulator capable of operating in a buck mode as well as a low power standby mode, in accordance with this disclosure.

In greater detail, the voltage regulator 100 is shown in FIG. 1. The voltage regulator 100 includes an error amplifier 102 receiving as input a reference voltage Vref and a feedback voltage Vfb, and generating an error voltage Vc to node VC. The error amplifier 102 has supply terminals coupled to a supply voltage Vcc and ground. A compensation network 104 is coupled between node VC and ground. The compensation network 104 comprises a series coupled resistor R0 and capacitor C0, coupled in parallel with a capacitor C1, between node VC and ground.

Node VC is coupled directly to control circuitry 107, to a buck output stage 120, and through an offset generator Voffset, to a linear output stage 106. The control circuitry 107 provides output to both the linear output stage 106 and the buck regulator 120. The linear output stage 106 provides output to the output node VOUT, while the buck regulator 120 provides output to inductor L1, which is coupled to the output node VOUT. A diode D1 has its cathode coupled to first terminal of the inductor L1, and its anode coupled to ground. The diode D1 is the recirculating diode of the buck architecture if the buck architecture, as shown, uses asynchronous rectification technology. The diode D1 may be replaced by a low side switch if the buck architecture uses synchronous rectification technology.

Series coupled resistors R1 and R2 are coupled between a second terminal of the inductor L1 and ground. A load capacitor or output filter capacitor Cload is coupled between the output node VOUT and ground, and a load 130 is coupled between the output node VOUT and ground.

In operation, the error amplifier 102 generates the error voltage Vc on the error node VC as a function of the differential between the reference voltage Vref and the feedback voltage Vfb. The feedback voltage Vfb is a voltage of the output voltage Vout as divided at node VFB by the voltage divider formed by the resistors R1 and R2 coupled between the output node VOUT and ground. The compensation network 104 provides for loop stability.

The control circuitry 107 selectively enables and disables the linear output stage 106 and the buck output stage 120 as a function of the error voltage Vc. In more detail, when the regulator is operating in a standby mode, the control circuitry 107 enables the linear output stage 106 and disables the buck output stage 120 if the error voltage Vc generated is less than a threshold voltage for at least a threshold period of time. When the regulator is operating in a normal operation mode, the control circuit 107 disables the linear output stage 106 and enables the buck output stage 120 if the error voltage Vc is not less than a threshold voltage.

When enabled, the linear output stage 106 generates the output voltage Vout as a function of the input voltage Vin in a manner such that the output current flowing through the output node Vout is no more than a limit current. The limit current is on the order of 10 ma, for example. Conversely, when enabled, the buck output stage 120 is configured to generate the output voltage Vout as a function of the input voltage Vin in a manner such that the output current flowing through the output node Vout is greater than the limit current.

Therefore, stated another way, the control circuitry 107 enables the linear output stage 106 and disables the buck output stage 120 if the current demanded by the load 130 in order to maintain the output voltage Vout at a desired level is no more than the limit current, and disables the linear output stage 106 and enables the buck output stage 120 if the current demanded by the load 130 to maintain the output voltage Vout at the desired level is greater than the limit current.

In addition to the power consumption reduction when operating in the normal operation mode, due to the limit current, the power transistor of linear output stage 106 can be small, saving silicon area as well.

Figure 2:
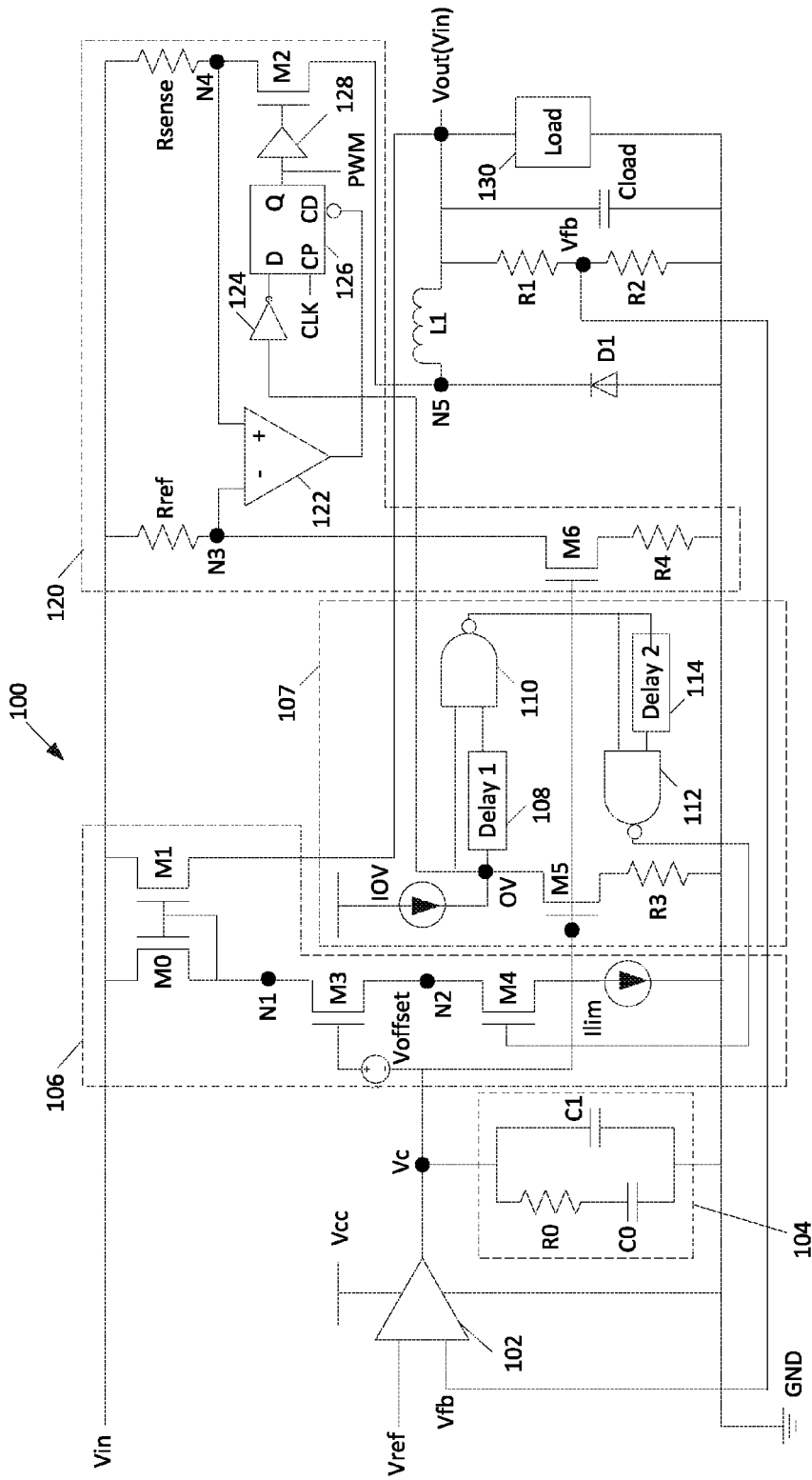
FIG. 2 is a more detailed schematic diagram of the regulator of FIG. 1.

With reference to FIG. 2, greater details of the voltage regulator 100 will be given. In particular, the control circuitry 107 includes a current generator IOV coupled to node OV. Transistor M5 has its drain coupled to node OV, its source coupled to ground through resistor R3, and its gate coupled to node VC. A first delay block 108 has an input coupled to node OV, and an output coupled to a second input of NAND gate 110. A first input of NAND gate 110 is coupled to node OV as well. An output of the NAND gate 110 is coupled to an input of second delay block 114, which in turn has its output coupled to a second input of NAND gate 112. A first input of NAND gate 112 is coupled to the output of NAND gate 110, and an output of NAND gate 112 is coupled to the linear output stage 106.

The linear output stage 106, in greater detail, includes a limit current generator Ilim. Transistor M4 has its source coupled to the limit current generator ILIM, its drain coupled to node N2, and its gate coupled to the output of NAND gate 112. Transistor M3 has its source coupled to the node N2, its drain coupled to node N1, and its control terminal coupled to node VC through offset generator VOFFSET.

A current mirror pair formed by transistors M0 and M1, having a ratio of 1:m, has its input coupled to N1 and its output coupled to the output node VOUT. Specifically, transistors M0 and M1 have their sources coupled to the input node VIN, and their gates coupled to one another and to node N1. The drain of transistor M0 forms the input to the current mirror and is coupled to node N1, while the drain of transistor M1 forms the output of the current mirror and is coupled to the output node VOUT.

The buck output stage 120 includes transistor M6 having its source coupled to ground through resistor R4, its drain coupled to node N3, and its gate coupled to node VC. Resistor Rref is coupled between node N3 and the input node VIN. A comparator 122 has an inverting input coupled to node N3, and a non-inverting input coupled to node N4.

A flip flop 126 has a D input coupled to node OV through inverter 124, a clock input CP coupled to a clock signal CLK, and a clear input CD coupled to an output of the comparator 122. A Q output of the flip flop 126 is coupled to driver 128, which in turn is coupled to a gate of transistor M2. The transistor M2 has its drain coupled to the node N4, and its source coupled to node N5. Resistor Rsense is coupled between node N4 and the input node VIN.

In operation, the transistor M5 and resistor R3 serve to detect the voltage at VC. If the error voltage Vc is higher than a threshold voltage, the voltage Vov at node OV is generated at a logic low. If the error voltage Vc is lower than the threshold voltage, the voltage Vov at node OV is generated at a logic high. The threshold voltage is determined as a function of the transistor M5, resistor R3, and current source IOV.

If the output voltage Vout is higher than the target voltage of the voltage regulator, the feedback voltage Vfb, via the error amplifier 102, ultimately results in the error voltage Vc being driven low. If the error voltage Vc is lower than the threshold voltage, the voltage Vov at node OV signal is generated as a logic high to indicate that the output voltage Vout is in an over voltage status. This happen when the current through the load 130 decreases to certain value.

As explained earlier, the node OV is connected to the D input of the D flip-flop 126 through inverter 124, and the clock signal CLK is connected to the clock input CP of the D flip-flop 126. The rising edges of CLK transfer the input D of flip-flop 126 to its Q output. The output of the flip-flop acts 126 as an enable signal of the transistor M2. The driver 128 drives the transistor M2 because the size of the transistor M2 is large to handle high currents.

Thus, the signal at node OV is used to determine whether the transistor M2 turns on at the coming rising edge of CLK signal. If the output voltage Vout is lower than the target voltage, the transistor M2 is switched on to thereby conduct power to the load 130. If the output voltage Vout is higher than the target voltage, the transistor M2 is not switched on. If the load 130 changes from heavy load to light load, the output voltage Vout would be higher than the target voltage for a while. During this period of time, the signal at node OV signal is at a logic high. The control circuitry 107 uses this signal to determine whether the linear output stage 106 is to be enabled and if the buck output stage 120 is to be disabled.

A reference current is generated from the error voltage Vc by transistor M6 and resistor R4 to set the reference current for the peak current detection of the current feedback of buck output stage 120. This reference current flows through resistor Rref to generate a reference voltage. The transistor M2 is the high side switch of the buck output stage 120, and the resistor Rsense senses the current in the transistor M2. The comparator 122 compares the voltage across Rsense to Vref to determine which is lower in each clock cycle after the transistor M2 is switched on. If Vref is higher, the output of the comparator 122 generates a PWM reset signal to reset the flip-flop 126 and turn off the transistor M2. If the voltage Vov at node OV is low, the D input of the flip-flop 126 is high. Then, at each clock cycle, the output of the flip-flop 126 is triggered to high by the rising edge of the clock signal CLK, and thus the transistor M2 is switched on and current flows through the resistor Rsense. Within the same clock cycle, if the voltage across Rsense is lower than Vref, the output of the comparator 122 set resets the flip-flop 126 to low to turn off the transistor M2.

During normal operation of the voltage converter 100, when the current through the load 130 is stable, the error voltage Vc generates a corresponding reference current on resistor Rref. The size of transistor M5, resistance of resistor R3, and rating of the current source IOV are chosen so as to be able to detect the over voltage behavior of the voltage regulator 100. If the current through the load 130 is low, the buck output stage 120 works in a mode where transistor M2 is switched on once every several clock cycles. Thus, the voltage Vov at OV is high for several clock cycles. Then, if the signal at OV remains high for a first delay time, the current through the load 130 is low enough to be supplied by the linear output stage 106. Then the transistor M4 is switched on to turn on the linear output stage 106. Meanwhile the buck output stage 120 is disabled to save power. This occurs because of the inversion of voltage ov by the inverter 124. Thus, the voltage regulator 100 is then operating in a low power standby mode.

If the current through the load 130 increases so as to be higher than the current limit Ilim of the linear output stage 107, the linear output stage 107 cannot supply the load 130 properly, and the output voltage Vout drops. The error amplifier 102, as a result of the difference between Vref and Vfb, thus drives the error voltage Vc higher. The voltage Vov at node OV is then driven low by the transistor M5 and resistor R3. The buck output stage 120 is then enabled to supply the load 130.

The linear output stage 107 and buck output stage 130 then work together for a second delay time. The voltage Voffset of VOFFSET is chosen to ensure that the transistor M3 is fully turned on at this time to ensure that the linear output stage 107 is working to supply its maximum output current, with the buck output stage 120 supplying the extra current to the load 130 as needed. After the second delay time, the transistor M4 is switched off to turn off the linear output stage 107. When the transistor M4 is off, the output current of the transistor M1 is switched off. The linear output stage 107 is therefore then disabled. Consequently, the buck output stage 120 then works alone to supply the load 130.

Regarding the limit current Ilim, if the transistor M4 is on, the maximum output current of the transistor M1 is limited to Ilim*m. Then the output current of the transistor M1 is controlled by the gate voltage of the transistor M3, which is controlled by the error voltage Vc. Vc is the amplified value of the error voltage between Vref and Vfb. So, when the transistor M4 is on, the output current of the linear output stage 106 is controlled by the loop with a maximum current limited to Ilim*m.

The design of the voltage regulator 100 provides for a variety of advantages. First, a quiescent current of the voltage regulator 100 is very low during low power standby mode. Also, since the output voltage Vout is regulated by the linear output stage 107 during the low power standby mode, there is nearly no ripple voltage at the output node VOUT of voltage regulator 100. The number of components added to a normal buck regulator is not great, and thus the size of the silicon is not excessively increased to implement the low power standby mode.

Although the preceding description has been described herein with reference to particular means, materials and embodiments, it is not intended to be limited to the particulars disclosed herein; rather, it extends to all functionally equivalent structures, methods, and uses, such as are within the scope of the appended claims.

The invention claimed is:

1. An electronic device, comprising:
    a linear output stage powered by an input voltage and configured to generate an output voltage at an output node;
    a buck output stage powered by the input voltage and configured to generate the output voltage at the output node; and
    control circuitry configured to:
        enable the linear output stage and disable the buck output stage if a current demanded by a load to maintain the output voltage at a desired level is less than a limit current; and
        enable the buck output stage and disable the linear output stage a delay period of time after enabling the buck output stage, if the current demanded by the load to maintain the output voltage at the desired level is greater than the limit current;
    wherein the linear output stage comprises:
        a limit current generator configured to cause generation of the limit current at a first node;
        a current mirror having an input coupled to the first node to receive the limit current and an output coupled to the output node, the current mirror configured to mirror the limit current from the first node to the output node; and
        third and fourth transistors source drain connected between the first node and the limit current generator.

2. The electronic device of claim 1, wherein the control circuitry enables the linear output stage and disables the buck output stage if an error voltage generated as a function of the output voltage is less than a threshold voltage for at least a threshold period of time.

3. The electronic device of claim 1, wherein the control circuitry disables the linear output stage and enables the buck output stage if an error voltage generated as a function of the output voltage is not less than a threshold voltage.

4. An electronic device, comprising:
    an error amplifier configured to generate an error voltage on an error node as a function of a reference voltage and a feedback voltage from a feedback node;
    a linear output stage configured to generate an output voltage to an output node as a function of an input voltage from an input node in a manner such that an output current flowing through the output node is no more than a limit current;

a buck output stage configured to generate the output voltage to the output node as a function of the input voltage in a manner such that the output current flowing through the output node is greater than the limit current;

a feedback loop coupling the output node to the feedback node; and control circuitry configured to selectively enable and disable the linear output stage and the buck output stage as a function of the error voltage, the selective enabling of the buck output stage occurring a delay period of time before the selective disabling of the linear output stage;

wherein the linear output stage comprises:
a limit current generator configured to generate the limit current;
a current mirror having an input coupled to a first node and an output coupled to the output node; and
third and fourth transistors source drain connected between the first node and the limit current generator, the third transistor being controlled as a function of the error voltage, the fourth transistor being controlled by the control circuitry.

5. The electronic device of claim 4, wherein the control circuitry enables the linear output stage and disables the buck output stage if the error voltage is less than a threshold voltage for at least a threshold period of time.

6. The electronic device of claim 4, wherein the control circuitry disables the linear output stage and enables the buck output stage if the error voltage is not less than a threshold voltage.

7. The electronic device of claim 4, wherein the current mirror comprises:
a transistor having a first conduction terminal coupled to the input node, a second conduction terminal coupled to the first node, and a control terminal; and
a first transistor having a first conduction terminal coupled to the input node, a second conduction terminal coupled to the output node, and a control terminal coupled to the control terminal of the transistor.

8. The electronic device of claim 4, further comprising a compensation network coupled between the error node and a ground node.

9. The electronic device of claim 8, wherein the compensation network comprises a series coupled resistor and capacitor, coupled in parallel with a first capacitor, between the error node and the ground node.

10. The electronic device of claim 4, further comprising:
a load coupled between the output node and the ground node;
a load capacitor coupled between the output node and the ground node;
first and second resistors coupled in series between the output node and the ground node;
an inductor coupled between the output node and a fifth node; and
a diode having a cathode coupled to the fifth node and an anode coupled to the ground node;
wherein the feedback node is coupled between the first and second resistors.

11. An electronic device, comprising:
an error amplifier configured to generate an error voltage on an error node as a function of a reference voltage and a feedback voltage from a feedback node;
a linear output stage configured to generate an output voltage to an output node as a function of an input voltage from an input node in a manner such that an output current flowing through the output node is no more than a limit current;

a buck output stage configured to generate the output voltage to the output node as a function of the input voltage in a manner such that the output current flowing through the output node is greater than the limit current;

a feedback loop coupling the output node to the feedback node; and control circuitry configured to selectively enable and disable the linear output stage and the buck output stage as a function of the error voltage, the selective enabling of the buck output stage occurring a delay period of time before the selective disabling of the linear output stage;

wherein the control circuitry comprises:
a threshold current source coupled to a threshold node and configured to generate a threshold current;
a fifth transistor having a first conduction terminal coupled to the threshold node, a second conduction terminal coupled to a ground node through a third resistor, and a conduction terminal coupled to the error node; and
wherein the threshold voltage generated at the threshold node and is determined as a function of the threshold current source, the third resistor, and a biasing of the fifth transistor as determined by the error signal.

12. The electronic device of claim 11, wherein the control circuitry further comprises:
a first delay circuit having an input coupled to the threshold node; and
a first logic gate having a first input coupled to the threshold node, a second input coupled to an output of the first delay circuit, and an output generating an enable signal to an enable node.

13. The electronic device of claim 12, wherein the linear output stage is controlled based on the enable node.

14. The electronic device of claim 12, wherein the control circuitry further comprises:
a second delay circuit having an input coupled to the enable node; and
a second logic gate having a first input coupled to the enable node, a second input coupled to an output of the second delay circuit, and an output coupled to control the linear output stage.

15. An electronic device, comprising:
an error amplifier configured to generate an error voltage on an error node as a function of a reference voltage and a feedback voltage from a feedback node;
a linear output stage configured to generate an output voltage at an output node, the output voltage being generated as a function of an input voltage from an input node, in a manner such that an output current flowing through the output node is no more than a limit current;
a buck output stage configured to generate the output voltage at the output node, the output voltage being generated as a function of the input voltage, in a manner such that the output current flowing through the output node is greater than the limit current;
a feedback loop coupling the output node to the feedback node; and
control circuitry configured to selectively enable and disable the linear output stage and the buck output stage as a function of the error voltage, the selective enabling of the buck output stage occurring a delay period of time before the selective disabling of the linear output stage;

wherein the buck output stage comprises:
- a sixth transistor having a second conduction terminal coupled to a ground node through a fourth resistor, a first conduction terminal coupled to a third node, and control terminal coupled to the error node;
- a reference resistor coupled between the third node and the input node;
- a comparator having a first input coupled to the third node, and a second input coupled to a fourth node;
- a sense resistor coupled between the fourth node and the input node;
- a flip flop having a signal input controlled based upon the threshold voltage, a signal output generating a PWM signal, and a reset input coupled to an output of the comparator;
- a PWM driver having an input receiving the PWM signal; and
- a second transistor having a first conduction terminal coupled to the fourth node, a second conduction terminal coupled to the output node, and a control terminal coupled to an output of the PWM driver.

16. The electronic device of claim 15, wherein the control circuitry enables and disables the buck output stage as a function of the threshold voltage.

* * * * *